(12) United States Patent
Garcia Morato Fernandez Baillo et al.

(10) Patent No.: US 9,135,712 B2
(45) Date of Patent: Sep. 15, 2015

(54) IMAGE RECOGNITION SYSTEM IN A CLOUD ENVIRONMENT

(75) Inventors: Pablo Garcia Morato Fernandez Baillo, Madrid (ES); Frida Issa, Madrid (ES)

(73) Assignee: AUGMENTED REALITY LAB LLC, Coral Gables, FL (US)

( * ) Notice: Subject to any disclaimer, the term of this patent is extended or adjusted under 35 U.S.C. 154(b) by 0 days.

(21) Appl. No.: 13/564,220

(22) Filed: Aug. 1, 2012

(65) Prior Publication Data

US 2014/0037203 A1   Feb. 6, 2014

(51) Int. Cl.
*G06K 9/00* (2006.01)
*G06T 7/00* (2006.01)
*G06F 17/30* (2006.01)

(52) U.S. Cl.
CPC ........ *G06T 7/0081* (2013.01); *G06F 17/30247* (2013.01)

(58) Field of Classification Search
CPC .................... G06K 9/4642; G06K 9/00288
See application file for complete search history.

(56) References Cited

U.S. PATENT DOCUMENTS

| | | | |
|---|---|---|---|
| 6,108,437 A * | 8/2000 | Lin | 382/118 |
| 6,501,852 B1 | 12/2002 | Clark et al. | |
| 6,628,837 B1 | 9/2003 | Greene et al. | |
| 8,064,707 B2 | 11/2011 | Chiang et al. | |
| 8,073,808 B2 | 12/2011 | Rose | |
| 8,165,414 B1 * | 4/2012 | Yagnik | 382/255 |
| 8,406,456 B2 * | 3/2013 | More | 382/100 |
| 8,457,367 B1 * | 6/2013 | Sipe et al. | 382/118 |
| 8,588,534 B2 * | 11/2013 | He et al. | 382/227 |
| 2003/0147558 A1 * | 8/2003 | Loui et al. | 382/225 |
| 2005/0185860 A1 * | 8/2005 | Denoue et al. | 382/305 |
| 2009/0060293 A1 | 3/2009 | Nagao et al. | |
| 2009/0274364 A1 * | 11/2009 | Shakya et al. | 382/165 |
| 2012/0039539 A1 * | 2/2012 | Boiman et al. | 382/195 |
| 2012/0086792 A1 | 4/2012 | Akbarzadeh et al. | |
| 2013/0202150 A1 * | 8/2013 | Sinha et al. | 382/100 |
| 2013/0322705 A1 * | 12/2013 | Wong | 382/118 |

OTHER PUBLICATIONS

Soyata, T.; Muraleedharan, R.; Funai, C.; Minseok Kwon; Heinzelman, W., "Cloud-Vision: Real-time face recognition using a mobile-cloudlet-cloud acceleration architecture," Computers and Communications (ISCC), 2012 IEEE Symposium on , vol., No., pp. 000059,000066, Jul. 1-4, 2012.*
B. Topc and H. Erdogan. Decision fusion for patchbased face recognition. ICPR, 1348-1351, Aug. 2010.*
(Continued)

*Primary Examiner* — Andrae S Allison
(74) *Attorney, Agent, or Firm* — DLA Piper LLP (US)

(57) ABSTRACT

An image recognition system in a cloud environment including uploading a plurality of images to the cloud environment, preprocessing the plurality of images, determining image classifiers for each of the plurality of images, extracting the features of each of the plurality of images, storing the images, features and classifiers, determining the image classifiers and key features of an image to be recognized from a multiplatform image device, selecting from the plurality of images, images which have the same classifiers as the image to be identified, matching a best one of the selected images with the image to be identified and displaying the match on a display of the .multi-platform image device. The system further functions by performing one or more of the above in the multiplatform imaging device and/or cloud environment.

6 Claims, 6 Drawing Sheets

(56) References Cited

OTHER PUBLICATIONS

Garcia et al, Face Detection Using Quantized Skin Color Regions Merging and Wavelet Packet Analysis, IEEE Transactions on Multimedia, vol. 1, No. 3, Sep. 1999.*

Calonder et al, Brief: Binary Robust Independent Elementary Features, Lecture Notes in Computer Science vol. 6314, 2010, pp. 778-792.*

Xu et al, A Rotation and Scale Invariant Texture Description Approach, Visual Communications and Image Processing 2010, edited by Pascal Frossard, Houqiang Li, Feng Wu, Bernd Girod, Shipeng Li, Guo Wei, Proc. of SPIE vol. 7744.*

International search report dated Feb. 7, 2014 issued in corresponding PCT application PCT/US13/53000.

* cited by examiner

IMAGE RECOGNITION SYSTEM IN A CLOUD ENVIRONMENT

BACKGROUND OF THE INVENTION

1. Field of Invention

The present invention relates generally to computer vision and specifically to image recognition in a cloud environment.

2. Prior Art

Recognizing an image based on specific features is a task easily solved by the human eye and brain that has been trained to do so, but it is still not satisfactorily solved by computers, particularly in portable devices. However while the human brain is capable of image recognition, the human brain has a difficulty in memorizing large amounts of information, i.e. associating specific information related to a large amount of images. The information attached to each image can vary between many kinds of multimedia information such as sound, video, images, and textual information and can be easily retrieved from a server if the corresponding image is matched. Still further, this problem, particularly for computers, is made more difficult since the associated information can be dynamic and change for the same image under different conditions and with movement.

In addition, the existing computer based image recognition systems require large amounts of data, long processing times, large non-portable devices and can not function in real time or close to real time. Examples of such systems are described in U.S. Pat. Nos. 6,628,837; 6,501,852; 8,073,808; and 8,064,707.

SUMMARY OF THE INVENTION

Accordingly, it is a general object of the present invention to provide an image recognition system which overcomes the difficulties of the prior art set forth above.

In particular it is an object of the present invention to provide an image recognition system which is capable of operating in real time or near real time in a relatively small mobile device such as a cellular telephone.

It is still another object of the present invention to provide such a system utilizing a cloud computing environment.

In keeping with the principles of the present invention, the objects are accomplished by an image recognition system including connecting to at least one processor having a memory in a cloud environment, uploading a plurality of images to the memory from an image source such as a mobile cellular phone or laptop, preprocessing the plurality of images, determining image classifiers for each of the plurality of images, extracting the key features of each of the plurality of images, storing the plurality of images in the memory based upon the image classifiers, uploading an image to be recognized to the memory from an image device, preprocessing the image to be recognized, determining the image classifiers for the image to be recognized, extracting the key features of the image to be recognized, selecting from the plurality of images in the memory images which have the same classifiers as those of the image to be identified, matching a best one of the selected images from the plurality of images to the image to be identified using at least one processor and memory, downloading the best match to the image device and displaying the match on the display of the imaging device.

In the present invention the cloud system is a disturbed system of multiple machines handling complex tasks concurrently. The cloud architecture of the present invention includes a dynamic number of machines created to present high performance in measures of speed and scalability. The machines are coordinated by one Master machine that receives the load of tasks and splits it over the available machines and creating new ones as necessary. The other machines are called Slave machines that handle specific tasks ordered by the Master machine. All the machines communicate together using a high speed network to send messages between all parts of the system. Each request to the cloud is handled by the Master machine and it splits it to sub tasks and puts it in an indexed queue. The tasks are sent to the rest of the slave machines and are removed from the queue only after they are done. Response is sent to the user once all sub tasks are finished. Another part of the cloud is the database which is also distributed over several machines and has one machine to control the requests for access. The access is synchronized in this multithreaded environment. Also, all the system parts are backed up for recovery if one or more shuts down.

In a first embodiment, all of the steps of the present invention except for the connecting to the at least one processor having a memory, uploading the plurality of images, uploading the image to be recognized and downloading the matched image and displaying the best match on the display are all performed by at least one processor having a memory in association with software in a cloud environment. In a preferred construction two or more processors and associated memories would be used to divide up the tasks and achieve faster recognition.

In a second embodiment of the present invention the extracting and classifying steps are performed in the image device such as a cellular phone and just the classifier and feature information is uploaded to the at least one processor having a memory in the cloud environment for further processing and matching.

In a third embodiment the image classification and feature information of the plurality of images stored in the memory in to the cloud system is downloaded to the image device based on predefined information associated with each image uploaded in the plurality of images stored in the memory. This information can be geolocation information of latitude and longitude, labels, categories, sectors, network speed, which might be transmitted directly from the image device, cellular phone, to the image device where the matching is performed.

Still further in any or all of the three embodiments, it is possible to break the tasks or steps of the process apart and have each performed by a separate processor and memory and/or divided based upon a classifier and/or feature. By using multiple processors in the cloud environment, the time required for identification or recognition of the image to be identified can be reduced and real time or near real time recognition of an image can be achieved.

BRIEF DESCRIPTION OF THE DRAWINGS

The above mentioned features and objects of the present invention will become more apparent based upon the following description together with the accompanying figures and in which.

DETAILED DESCRIPTION OF THE INVENTION

Figure 1:
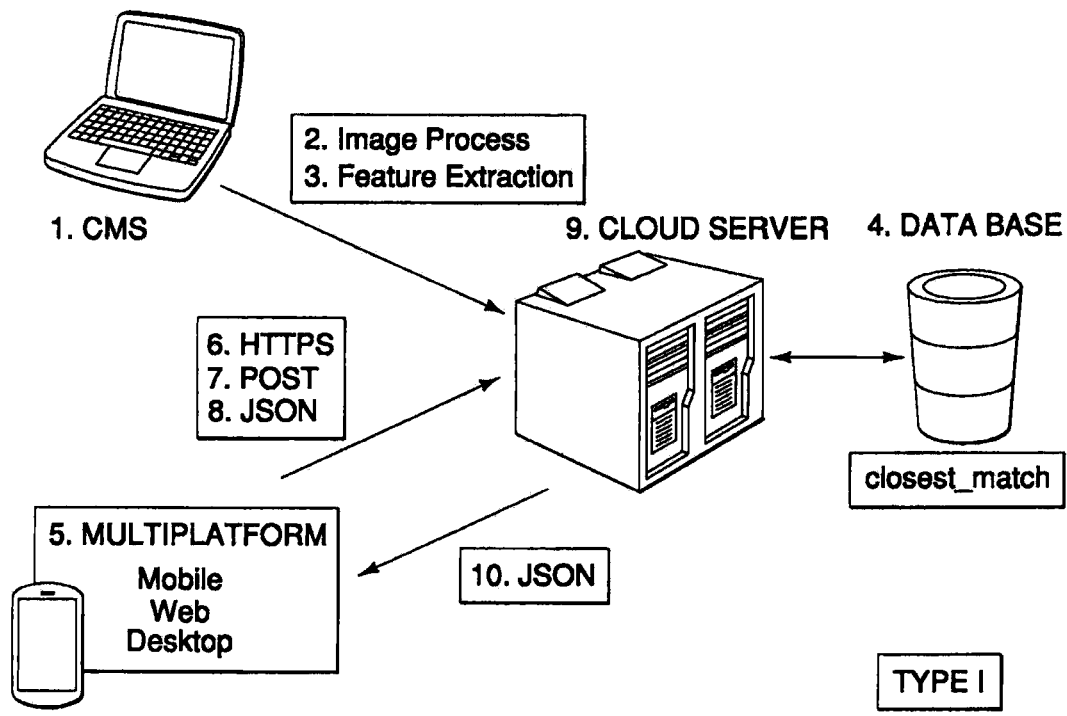
FIG. 1 is a high level diagram of the process of a first embodiment of the present invention.
Figure 2:
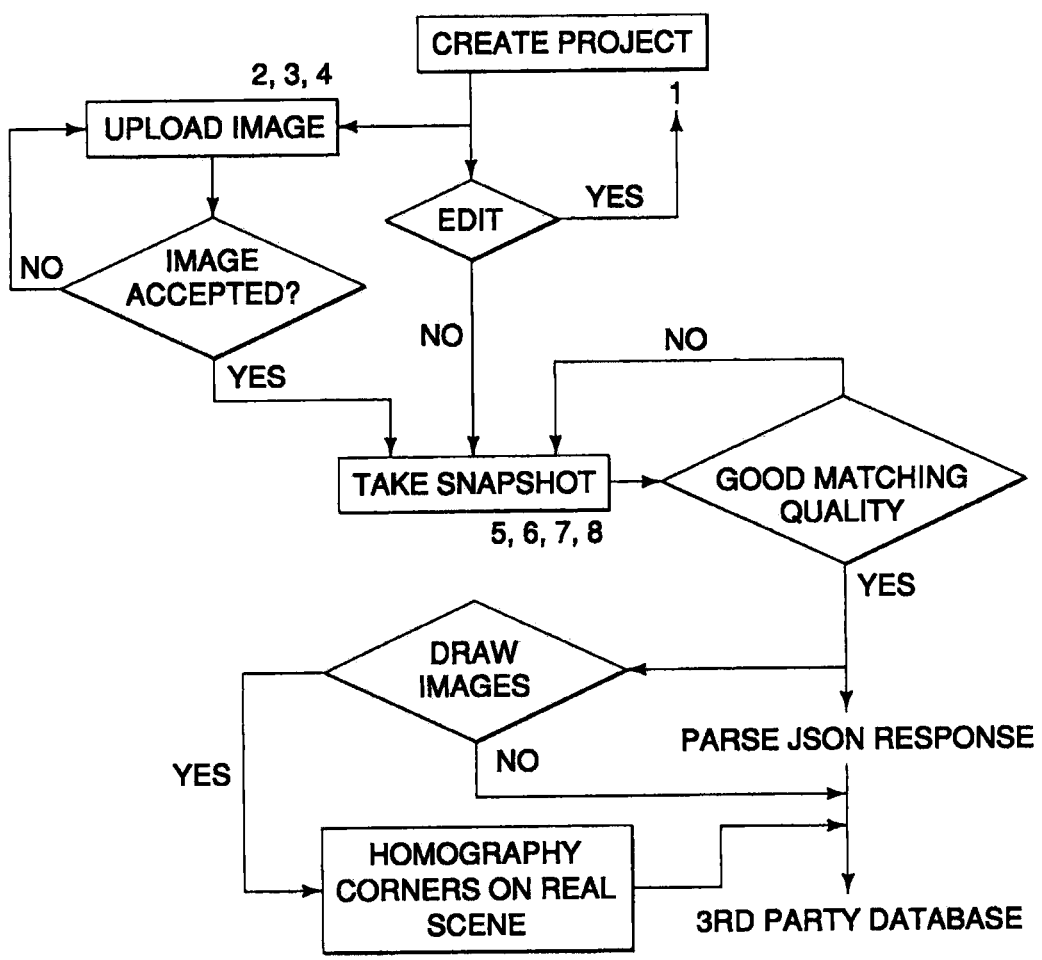
FIG. 2 is a functional block diagram of the work flow of the system of the first embodiment of the present invention of FIG. 1.

Referring to FIGS. 1 and 2, shown therein are a first embodiment of the present invention. In the image recognition system shown in these figures, a web user interface (CNS) 1 is connected via a network such as the internet to a server 9. The server 9 can be a part of a cloud computing system which includes a processor, memory and software. The memory is utilized for not only the software but also to support a database 4. The server 9 is further connected to a multiplatform image input device such as a cellular phone, a laptop computer, desktop computer, tablet, netbook, video camera, still camera, source of streaming video etc. via a network such as the internet and/or a data network carried on a cellular telephone system, such as G3 or G4 data system is preferred. Still further image device can be any device that has access to network and has images to recognize under the formats utilized by the system.

In operation, firstly the image recognition system is registered on the cloud server 9 which includes an application program interface (API) which includes an account which is supported by a username and password. Alternately and for other operating systems other interfaces could be used such as an application binary interface (ABI) which can be utilized with Linux. Next, utilizing the web user interface (CMS) 1, a user can log into the system on the cloud server 9 and a plurality of images can be uploaded to the memory. These images are to be utilized so as to recognize or identify an image uploaded from the multiplatform image input device 5.

Each of the plurality of images is preprocessed in the server 9. The preprocessing includes a sanity check in which it is determined if the uploaded image file is in fact an image. To do this, the server together with software performs checks to determine what the file is. Such checks include checking the file extension on the uploaded image file to determine if the file extension is one of the system's supported image formats, such as JPG, GIF, PNG or TIF. If it is not, the image file is rejected. Another check that is performed after the image file has passed the extension check is to determine if the inner data is in a format which the image file should contain. For example, one format such as a JPG image includes specific properties which the system could look for within the file. If the image file passes both of these checks, the file is considered and treated as an image file and passes the sanity check. Next as part of the preprocessing, the image is resized to a predetermined size and all of the images to be considered and stored in the system must be of this same predetermined size. Finally in this part of the preprocessing, the image file is smoothed so that only the strong features remain. Any smoothing program which performs this function can be utilized and such programs are well know to those skilled in the art.

Next in the image recognition process, the image is classified by color histogram, laplacian and shape of the key points (morphology). In particular, each of the plurality of images is analyzed to determine its dominant color. Next, each feature of each image is analyzed to determine its laplacian value direction and the laplacian of each of the key points of each of the images is stored. Next, the shape or distribution of the key features in the image is determined. In other words, the morphology of the image is determined. Still further and if possible, other classifiers such as geolocation, i.e. longitude and latitude, in which the image exists, music associated with the locale, sounds that exist at the locale, etc. can be uploaded with the image, each image is then classified by its dominant color, laplacian value, morphology and where possible other classifiers. This information is stored in memory 4 for each of the plurality of images which have been uploaded to the server 9. The recognition of the dominant color, the determination of the Laplacian and morphology can be performed with software well know to those of ordinary skill in the art.

Next, for each of the plurality of images, the algorithm extracts the information about the image. The image is split into N patches. Each patch is a piece of the image. The patches never overlap each other and they cover the whole image size. The size of the patch is dependent on the number of patches assigned to the image. The bigger the number of patches there is, the more time it will consume in preprocessing. From each patch of the image is extracted the key points. The key points are extracted by intensity comparison. Each patch is the base of a single class. Every class includes several transformation of the patch. Each transformation in scale, rotation and brightness over the original patch creates other co-patches that are similar but smaller, bigger, rotated, darker, brighter etc. The information collected from each co-patch is a comparison between intensities in the surrounding of each pixel in the co-patch. When a pixel has intensity differences between itself and its neighbor pixel it is assigned to be a key point. Later for each key point we calculate the probability to appear in the whole class. This means that a strong key point will survive the transformation and will have a high probability to appear, while a weak key point will be greatly affected by the scaling, rotation, darkness or brightness condition and it will cause it to disappear from some co-patches and therefore have a low probability. At the end of the processing there will be N classes corresponding to N patches, having calculated the probability for every key point to appear in each class.

It is very important to train the system with various rotation degrees, scaling and brightness transformations to be able to cover many possible conditions of the image matched from different distances, at different rotation angle and in different environment conditions.

Next, an image to be recognized is uploaded to the server 9 in the cloud environment by the multiplatform image device 5. In a similar manner as the plurality of images were processed, the image to be recognized is preprocessed, is classified according to its color, laplacian values and morphology and the key features are extracted by the cloud server 9. The image to be recognized, key features and classification are stored in the database 4.

To begin the determination or recognition of the image, from the plurality of images which were previously uploaded and stored in the database 4, those images of the plurality of images which have the same classifiers as the image to be recognized are selected or extracted from the database. It is only these images which will be processed or compared with the image to be recognized. In addition and in reality it is not the images which are compared since this is a slow process. Instead it is the key points of the image to be recognized and the plurality of images previously uploaded which have been processed and analyzed. The analysis or matching is done by finding for each key point in the input frame its corresponding key features in each class according to the highest probability. Each features is compared against the highest probability key point in each class and if they have the same intensity information then it will be marked as found. This procedure is repeated for all the key points in the input image, comparing them with the class's high probability key points. When this loop is finished, a group of matched key points from several classes will have found. The key points that are matched should belong mainly to one transformation and therefore it will not only be know that the image is detected, but also where it is, because each key point that has been matched at what rotation and scale condition has been found.

Once the image to be recognized has been processed, the cloud server 9 will send a java script object notation response (JSON) to the multiplatform image device via the network and will further send whatever other information it may have or contain to identify the image to be recognized.

Figure 3:
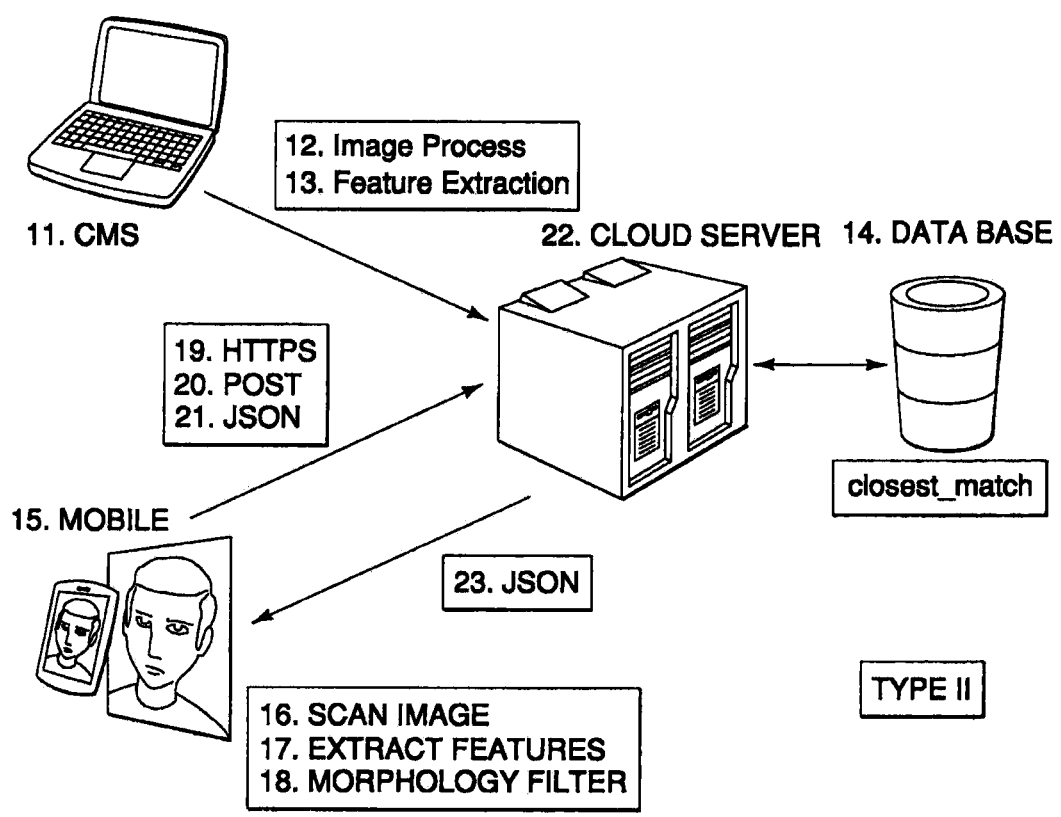
FIG. 3 is a high level diagram of a second embodiment of a process to identify an image of the present invention.
Figure 4:
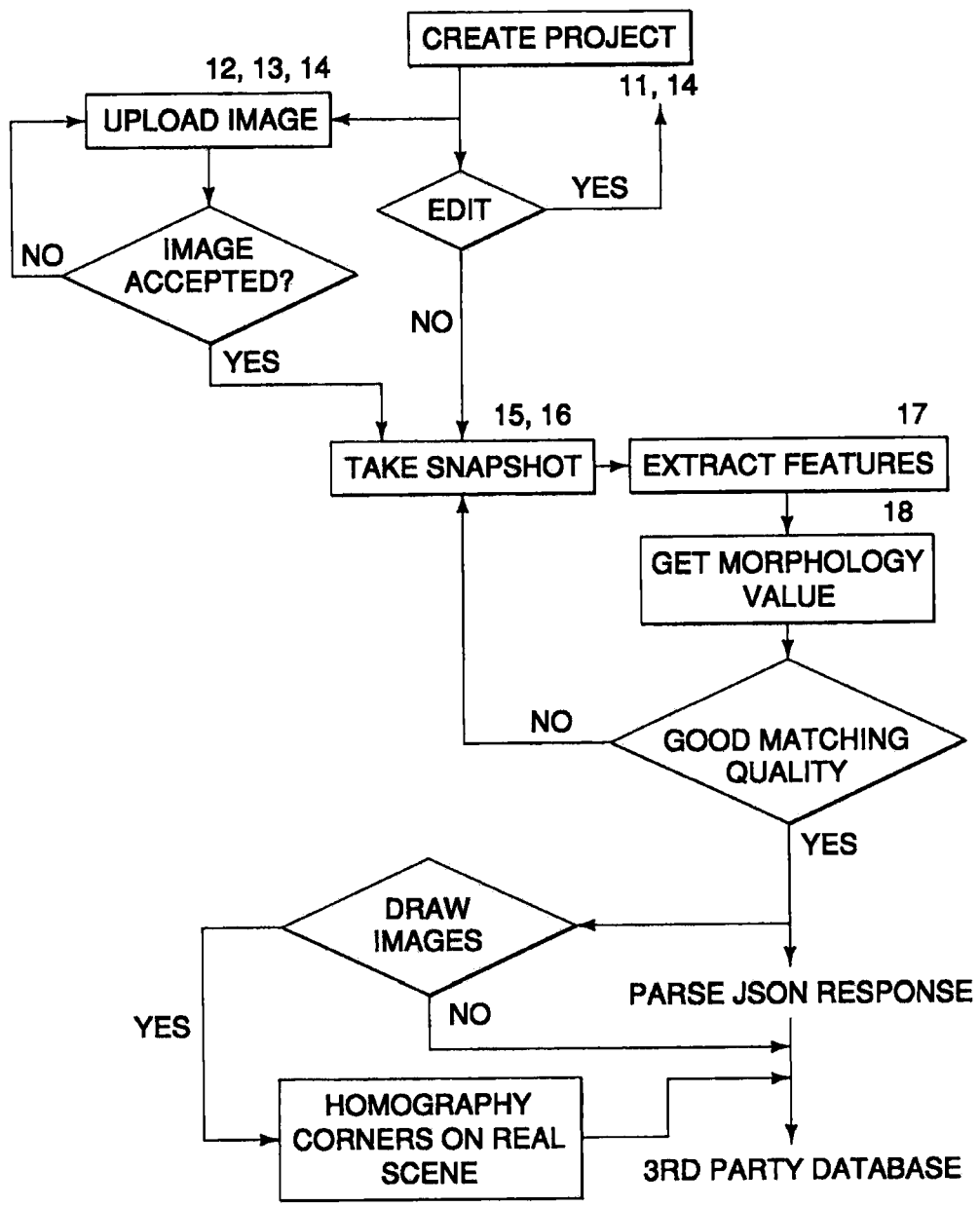
FIG. 4 is a functional block diagram of the second embodiment of FIG. 3.

Referring to FIGS. 3 and 4, shown therein is a second embodiment of the present invention. In this second embodiment, the plurality of images is uploaded from the user interface 11 to the cloud server 22 where the preprocessing, classification and determination of the key features are made and stored in the database 14. Contrary to the first embodiment, the preprocessing, classification and key feature extraction from the image to be recognized is performed in the multiplatform image device 15 using similar methods as was done in the server 9 in the first embodiment. Once this processing is completed, the classification data and key feature data is transferred via a network such as the internet utilizing HTTPS, POST or JSON to the cloud server 22 for the analysis, and the matching information is then transferred back to the multiplatform imaging device 15.

Figure 5:
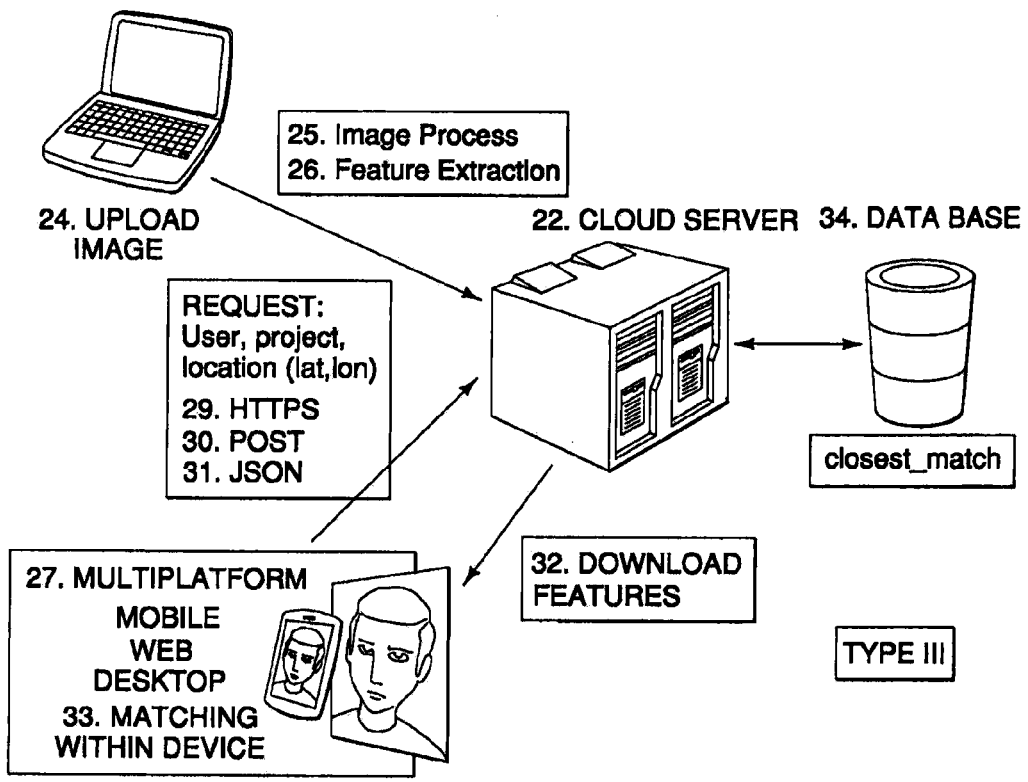
FIG. 5 is a high level diagram of a third embodiment of a process to identify an image of the present invention.
Figure 6:
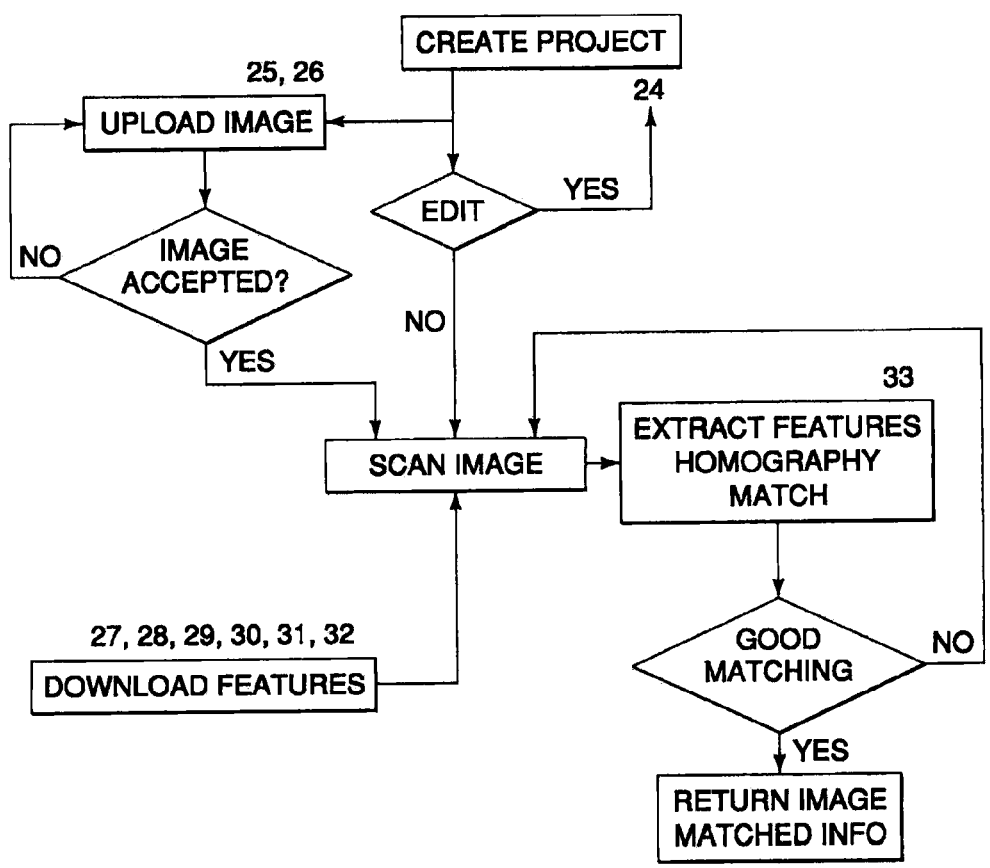
FIG. 6 is a functional block diagram of the third embodiment of FIG. 5.

Referring to FIGS. 5 and 6, shown therein is a third embodiment of the present invention. Similarly to the first embodiment, the plurality of images are uploaded from the web user interface 24 to the cloud server 22 and saved in a database 34 after processing, and the image to be recognized is further uploaded to the cloud server 22 from the multiplatform imaging device 27.

In this third embodiment as shown in FIGS. 5 and 6, the preprocessing, classification and key feature extraction of the plurality of images is done in the cloud system, but unlike the previous embodiment, the matching process occurs in the remote devices (multiplate form imaging device 27), asking for recognition, themselves. While the pool of features lies in the server 22, the device 27 sends more information about specific images they want to recognize and those images features are downloaded to the device 27 and then the device 27 can recognize the image locally at its end.

In the imaging device 27, the matching of the key features of the image to be recognized and the selected ones of the plurality of images is performed. However, it should be recognized that the processing power of the imaging device 27 is much less than the processing power of the cloud server 22 and as a result for the imaging device 27 to process and match the image to be recognized rapidly, it is important that a subset of the images to be compared with be selected based upon a selected subset identifier or identifiers such as geolocation info, labels, categories, networks, ids and other different classifiers of the subset and be chosen to have its features downloaded and recognize in real time in the device 27. The information utilized in selecting the potential images from the plurality of images reduces the number of images and the amount of information to something which can be processed quickly or rapidly by the imaging device 27.

It should be apparent to one skilled in the art and as mentioned above, to speed up the present invention it could be preferably implemented in a cloud environment. The present invention could be configured in a cloud based environment comprising a multi-server distributed system that would manage and split the load of the image recognition requests. The system implemented in a cloud environment would be multithreaded and each request is shared between several distributed servers. The architecture of the system is based upon leveraging map-reduced distributed computing algorithm to compute the nearest image to the one to be recognized from the database stored in the memory of the cloud environment. The system uses partitioning techniques to be able to process huge image databases stored in the memory of the cloud environment in order to find the match. The distributed computing algorithm has two phases. In the first one, the images are uploaded to the distributed database partitioning the data into auto-processing blocks. In the second stage, the image to be recognized is matched against the database in the cloud environment using as many tasks as there are computing blocks (servers and memories) in the cloud environment available. Combining both of these paradigms offers fiat response times based on the number of concurrent requests and the adaptive number of servers processing the distributed tasks.

While the present invention has been described in terms of single embodiments, it is also possible to provide all three embodiments in a single device and allow the user to select which embodiment he would like to use based upon the conditions and user requirements.

It should be apparent to one of ordinary skill in the art that the above described embodiments are but a few of the many possible embodiments which can be made embodying the principals and objects of the present invention.

The invention claimed is:

1. An image recognition process comprising:
   determining image classifiers for a plurality of reference images stored on a cloud server;
   splitting each of the reference images into a plurality of patches;
   extracting key points from each of the patches by intensity comparison;
   creating a class for each of the patches that includes multiple transformations of the patch;
   calculating a probability for each of the key points that the key point appears in the whole class;
   uploading an image to be recognized to the cloud server from an imaging device;
   determining image classifiers for the image to be recognized;
   extracting key points of the image to be recognized by intensity comparison;
   selecting from the reference images those images that have image classifiers in common with the image to be recognized;
   matching one of the selected images to the image to be recognized by comparing the key points of the image to be recognized with the key points of the selected images according to the probability that the key point appears in the whole class;
   downloading a match to the imaging device; and
   displaying the match on a display of the imaging device.

2. The image recognition process according to claim 1, further comprising preprocessing to determine if a file is an image by checking a file extension and checking if format properties of an image file are contained in the file, resizing the image to a predetermined size and smoothing the image so that only the key features remain.

3. The image recognition process according to claim 2 wherein the image classifiers are determined by determining dominant color, laplacian value and morphology.

4. The image recognition process according to claim 2, wherein the preprocessing is performed in the cloud server.

5. The image recognition process according to claim 1, wherein the imaging device is selected from a group consisting of a mobile telephone, a smartphone, a laptop computer, a netbook computer and a tablet computer.

6. The image recognition process according to claim 1, wherein the class for each patch includes various rotation degrees, scaling and brightness transformations of the patch in order to cover many possible conditions of the image matched from different distances, at different rotation angles and in different environment conditions.

* * * * *